July 25, 1933.  C. A. BAY  1,919,457

CONNECTING DEVICE FOR ELECTRICAL CONDUCTORS

Filed Jan. 16, 1929  2 Sheets-Sheet 1

INVENTOR
CHARLES A. BAY
BY Eilers & Schaumberg
ATTORNEYS

July 25, 1933.   C. A. BAY   1,919,457
CONNECTING DEVICE FOR ELECTRICAL CONDUCTORS
Filed Jan. 16, 1929   2 Sheets-Sheet 2

INVENTOR
CHARLES A. BAY
BY
ATTORNEYS

Patented July 25, 1933

1,919,457

UNITED STATES PATENT OFFICE

CHARLES ANDREW BAY, OF MORRISTOWN, NEW JERSEY, ASSIGNOR TO JAMES R. KEARNEY CORPORATION, OF ST. LOUIS, MISSOURI, A CORPORATION OF MISSOURI

CONNECTING DEVICE FOR ELECTRICAL CONDUCTORS

Application filed January 16, 1929. Serial No. 332,942.

This invention relates to improvements in connecting devices for electrical conductors, and more particularly to underground cable junction boxes.

An object of the present invention is to provide an improved cable junction box, which will permit the rapid sectionalizing of cables, in the event of electrical disturbance or fault, and will further enable the faulty section to be quickly disconnected and replaced by a new conductor section with a minimum interruption of service.

A further object is to provide, as an improvement in a cable junction box, means to permit and facilitate the electrical connection of a line or cable, with a similar current carrying conductor, without danger of grounding the live conductor.

A still further object of the present invention is to provide, in a device of the class described, improved enclosed means for positively, securely clamping the ends of a line or cable inserted therein, which means shall also serve as a device for splicing together cables or conductors, with greater speed and convenience than is possible by the use of the older prevailing methods of cable splicing.

An additional object is to construct a cable box for the purposes recited, so that it shall require a minimum of space, and so that this limited available space is completely utilized, to the end of providing a compact and safe assembly, which is practical, permanent, and adaptable to a variety of uses in cable service runs.

Figure 1:
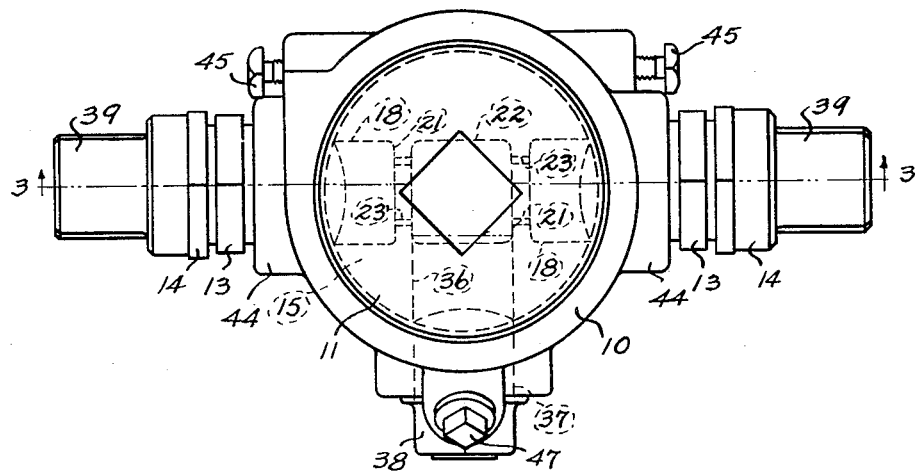
Figure 2:
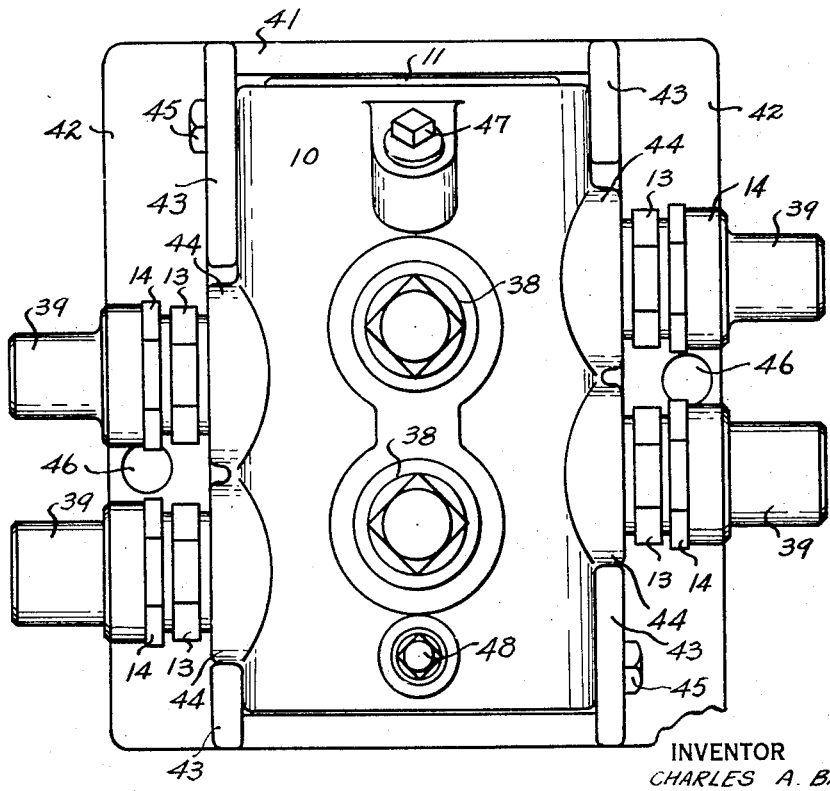
Figure 3:
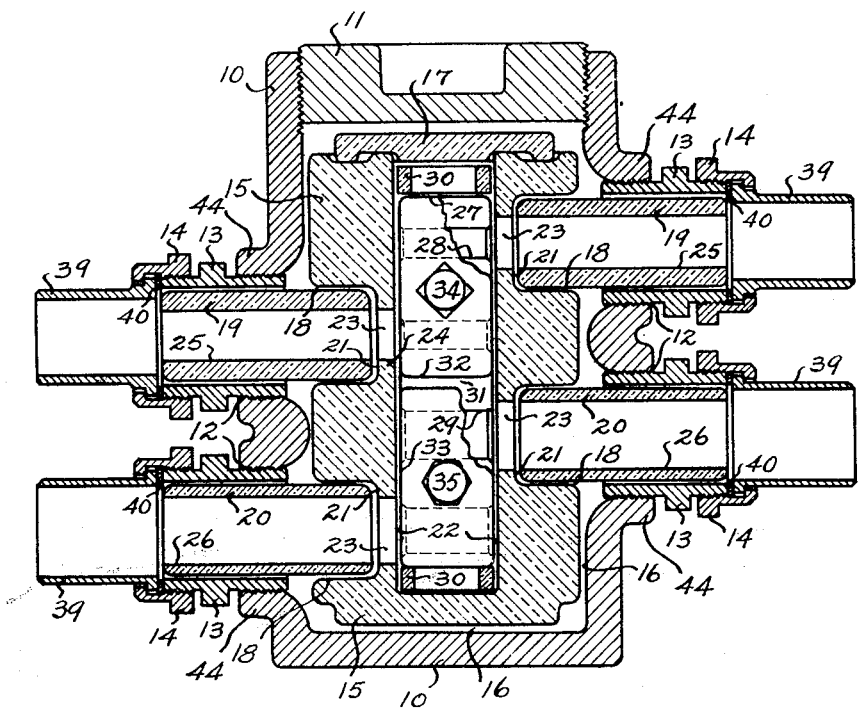

Further objects and advantages will appear from the following detailed description of parts, reference being had to the accompanying drawings, in which, Fig. 1 is a plan view of the improved form of cable box; Fig. 2 is a front elevation of the construction shown in Fig. 1, and showing in addition, a preferred form of rack attached to the cable box; and Fig. 3 is a sectional elevation taken along the line 3—3 of Fig. 1.

It will, of course, be understood that the present drawings and description relate to a single, preferred executional embodiment of the present invention, and that substantial changes in the construction and arrangement of the parts may be made without departing from the spirit and the underlying principles of this invention.

The preferred construction of the cable box comprises, essentially, four principal parts, namely, a housing; sleeves for attaching the lead cables to the housing; and a central insulating body in which is positioned a contact terminal block, adapted positively to grip and clamp the cable ends inserted therein.

Referring by numerals to the preferred example shown by the drawings, in which like reference characters designate similar parts throughout the several views, a housing 10 is provided, which is preferably cylindrical in form, and one end of which is closed and the other open; the open end forming a threaded seat for receiving a cover 11. On opposite sides of the housing 10, are provided openings 12, which bear a spaced or endwise staggered relation to each other. Outlet nipples 13 are detachably secured into these openings, and form means for attaching sleeve shank nuts, shown at 14, for a purpose that will hereinafter appear. The housing 10 may be formed of any suitable material, such as cast-iron or the equivalent. It has been found that, while the cast metals provide a durable and inexpensive material for the housing, they have a certain porosity as well as a tendency toward sweating, that is injurious to the operating efficiency of the box, and for these reasons, a suitable water proofing compound is preferably applied to the outer and inner surfaces of the box. It will be readily understood that the inner chamber of the box must be kept free from any moisture, in order to maintain certain of the parts inside the container, in insulated relation.

A central insulating body 15, or liner, is positioned within the housing, so as to provide a substantially uniform clearance 16, as shown. I prefer to cushion the insulating body at top and bottom, from contact with the metal housing, by means of suitable gasketing material or the like, not shown.

By interposing a resilient material between the ends of the body 15, and the housing, it will be seen that the cover 11, when secured in place, serves to position the insulator body and its closure member, hereinafter described. The described resilient inserts are omitted from the drawing in the interest of clearness. The insulator 15 may be formed in any suitable manner, but by preference, is constructed in the form of a cylinder, in which one end is closed, and the other end open. An insulating cover 17 is provided as a closure for the open end of the insulator. In the example illustrated, the insulator 15 and its cover 17, are formed of porcelain, although any other suitable material may be used. On opposite sides of the insulator 15, are provided openings 18 with which openings 12 of the housing are in register, the openings 18 being adapted to aid in positioning the insulator in the housing by the insertion in the last named openings, of tubular members 19 and 20. In assembly, the inward movement of the members 19 and 20 is limited by stop shoulders 21, formed substantially in the base of the openings 18. The members 19 and 20 are formed, preferably, of an insulating material, in order better to insulate from the grounded portions of the housing, the live lines passing therethrough.

The insulator is provided with a central chamber 22, and communication with this chamber is provided for by openings 23 formed in the walls 24 of the insulator. It will be readily seen that a cable may be inserted from the exterior of the box, through any of the openings 23, into the chamber 22. In the example illustrated, the openings 25 and 26 through the members 19 and 20 are shown as formed, respectively, of smaller and larger diameter, in order to accommodate the smaller and larger sizes of cable usually to be connected by a device of the present sort.

The interior chamber 22 is preferably formed to present a square cross sectional interior, in order to conform to the general shape of a terminal block 27, and thereby form a positive positioning means for this element and its related parts. The contact terminal block 27 provides clamping means for, and connection between the conductor ends, which extend into the chamber 22. Grooves 28 and 29 are formed in the block, and are in aligned relation with the openings through the insulator body and the casing. To insure and maintain this aligned relation, the terminal block is positioned, and properly aligned, by insulating blocks 30.

The terminal block 27 is shown in three pieces 31, 32 and 33, although other constructions may serve the same general purpose. The member 31 of the block provides a base or clamping member, against which the other members 32 and 33 are adapted to be secured by bolts, cap screws or the like. Each of the members 32 and 33 is slightly less in length, than half the length of the base block 31. By this provision, each member is adapted to be clamped to the base block, separately, and without interference with the companion clamping member. In order easily to distinguish the individual members 32 and 33, the bolts or cap screws, 34 and 35, are preferably provided with square and hexagon heads, respectively. Further, each member 32 and 33 is provided with a plurality of grooves 28 and 29, each of which forms a substantially circular opening between the base 31 and its clamping member. These grooves are formed part and part in the related members, and are so constructed that when a cable is inserted and clamped into a groove between the related members, a clearance is left between the faces of the clamped members. This feature insures a positive clamping action upon even a small cable, and obviates the possibility of the members being clamped upon themselves, without positively gripping the cable. The grooves 28 and 29 may be made of different diameters, to correspond with the various sizes of cables used. The grooves are positively aligned with the related openings 23 of the insulator 15, so that when a cable is inserted from the exterior of the housing through the openings in the insulator tube, and thence through the openings 23, the cable passes directly into the groove formed in the terminal block. The terminal block being formed of conducting material, serves to connect, electrically, all of the conductors engaged by it.

Insulating wrenches (not shown) may be provided, which are adapted to be inserted through the openings 36 and 37 (shown in dotted lines in Fig. 1) of the housing and insulator 15, respectively, for operative, wrenching engagement with the heads of the bolts or cap screws of the terminal block. Except when the wrenches are in use, the openings 37 are closed by threaded plugs 38, or their equivalent.

The preferred application and use of the described cable box, is in connection with lead sheath cables, although the device may obviously be used with many other forms of conductors. In installing the device, the cables or like conductors are inserted through sleeves 39 and connected thereto by soldered or wiped joints. The sleeves are then secured to the nipples 13 by means of nuts 14. A water tight connection is effected by the preferred use of gaskets 40, as shown. It will be understood that a cable, for insertion into the clamping block, should be prepared properly, as by stripping, and for this purpose a special jig or tool (not shown) may be used, although any suitable means may be employed for the same result.

For convenience, the entire junction box assembly is adapted to be supported on a suitable rack 41, of which a preferred form is shown in Fig. 2. The base 42 has projecting arm portions 43 which are adapted to straddle the nuts 13 and bosses 44 of the housing, and thereby position the box in or on the rack. The box is adapted to be secured to the rack by means of cap screws 45. The box and rack are arranged to be secured to a wall or stand, by fastening means associated with openings 46 in the base 42. By removal of the cap screws 45, the box may be separated from the rack, while work is in progress on the cables, without any interference with other adjacent boxes, which may be in the same group.

To insure complete insulation of parts within the housing, the interior of the box may contain a suitable depth of insulating oil or the like, which is conveniently introduced through plugged opening 47. The oil in the box may be drained through plugged opening 48. Although the parts of the device are so constructed as to prevent the occurrence of any grounding action, or flashovers, the provision of a liquid insulating medium within the housing, makes for an even greater factor of safety.

In use, the preferred construction of the assembly presents a number of advantages. A cable prepared for insertion into the box may be passed through the openings provided, directly into the terminal contact block and there clamped in place. It will be seen from Fig. 3 that the lower holes 12 on each side of the housing 10 are adapted for large or through cables, and that the clamping block 33, associated with this cable, is provided with a hexagon head cap screw 35, for engagement by a hexagon socket wrench. The clamping block 27, preferably provides means for clamping one or more cables to the base 31. For this purpose a cable end may be inserted from each side, into the holes 12, and a through run cable installed and connected into the junction box in a few minutes time.

The upper holes 12 on each side of the box are adapted for smaller or tap cables; an additional cable inserted and clamped to the base 31 by means of the clamping block 32, is thus brought into electrical contact with the through cable. In the event that only one cable is clamped to a separate block, the insertion of a suitable rod of insulating material, the size of a bare cable, into the vacant groove, when clamping the cable and rod in place, eliminates any tendency for the cap screw to bend and further insures a better clamping action on the cable. It will be understood that the outer entrance left vacant, may be closed by any suitable cap (not shown) which may be threaded to the nipples 13.

In order to prevent injury to an operator, a special wrench not shown may be used for clamping the cables to the terminal block. This wrench may be formed of any suitable insulating material, and preferably is provided with a socket in one end. It will be understood that the hexagon socket is applicable as shown, to only one of the cap screws or bolts associated with the clamping device, while a similar socket the clamping device, for example, to engage a wrench, adapted, for example, to engage a square head, screw or bolt, may be provided to fit another cap screw of the clamping device. This provision fixes the relation between the through and tap cables, and precludes mistakes or uncertainty in making or changing connections. Should the operator wish to change or insert a tap cable, he would, for example, select the square head wrench, and thereby be certain to actuate the particular clamp appropriate to effect the desired connection.

In addition to the advantages enumerated and implied from the preceding description, the present invention does away with the expense and time incident to cable splicing and the wiping of joints under the prevailing methods. The described assembly further is conducive to the use of shorter sections of cables, and more rapid sectionalizing and isolation of faulty sections. In this event, that section of the through run cable, between the faulty section and the energizing center, may continue to be energized and service maintained. In case there is a power source at each end of the through run cable, service may be continued on both sides of the fault, during the brief time required to prepare and insert a new section of cable. To effect this actual replacement, it is necessary to deenergize the through run of cable for only a short interval, thus minimizing circuit interruptions. A further advantage is presented, in that all repairs and insertions may be made with perfect safety to the operator.

The assembly described provides a means applicable to a variety of uses and installations which will at once suggest themselves to those skilled in the art, and in fulfillment of the objects set forth above.

I claim as my invention:

1. A live-tapping cable junction box including an accumulating clamp, a member of dielectric material for housing said clamp, a waterproof enclosure for the clamp and housing member, and a hollow tubular member forming a cable passage, and interconnecting wall portions of the enclosure and housing.

2. A cable splicing device including a connector adapted to accommodate a plurality of cables, cable seats spaced from each other along the connector, a housing for the connector and an insulating element having individual cable directing passages extending between the connector and housing, certain of said passages adapted to permit the safe insertion of conductors while the splicing device is in service, being spaced from each other to correspond to the spacing of seats on said connector, and adapted thereby to establish the position of such conductors relative to the connector, and entrance bushings for the individual cables, disposed in line with the several passages, and interengaging said housing and insulating element.

3. In a cable connecting device, a cable clamp, a one-piece housing therefor, a cover for the housing, a hollow insulating liner for the housing, shaped internally to position said clamp, independently of cables engaged by the clamp, a cable bushing interengaging the housing and liner, and a closure for said liner, adapted to be secured by the cover for said housing.

4. In a cable connecting device, a clamp for a plurality of cables; an enclosing structure therefor, and having cable openings; members secured to the cable for sealing said openings and positioning the cable relative to the device, means associated with said structure, forming ports for access to said clamp, independent of the cable openings, and an insulator forming substantially continuous, tool-directing passages from said ports to said clamp, and adapted to insulate the clamp from the enclosing structure.

5. In a cable connecting device, a housing, cable connecting means in the housing, an insulating member between the connection means and housing, and an entrance bushing adapted relatively to position said member and housing, independently of the cable.

6. A cable connecting device including a clamp, an enclosure for the clamp, having openings to accommodate a plurality of cables and openings for access to its interior, an insulator within the enclosure, having a well therein, shaped to receive and position the clamp, and provided with passages aligned respectively with the openings in the enclosure, and an insulating bushing extending into each of the aligned cable openings and passages, and adapted to position the insulator relative to the enclosure.

7. In a junction box, a casing having a plurality of conductor openings disposed in staggered relation at opposite sides thereof, a closure member threadedly associated with the casing, a unitary insulating liner removably associated with the casing, having cable openings arranged to register with said openings in the casing; a connector clamp within the casing comprising an elongate metal base transversely grooved to provide a plurality of cable seats, and a plurality of individually operable clamping members spaced along and coacting with said base, each adapted to clamp a pair or more of cables in relatively adjacent cable seats of said base.

8. In a junction box, a connector assembly including an elongate metal base having a plurality of laterally spaced cable receiving seats extending transversely thereof, and a plurality of individually operable clamping blocks each adapted to secure a plurality of cables to said base; an insulating housing for the connector assembly and a waterproof casing for the housing, said housing and casing having side wall openings arranged to register with said cable receiving seats, and insulating bushings forming cable passages, interconnecting said wall openings.

9. In a junction box, a connector assembly comprising a plurality of clamping blocks, each grooved to receive a pair of spaced, parallel cables, an elongate metal base common to said clamping blocks, and clamping bolts providing for individual actuation of said blocks; a housing, a hollow insulating liner for the housing shaped internally to receive and position the connector assembly, said housing and liner having side wall openings aligned with the grooves in said clamping blocks, and cable bushings interengaging the housing and liner.

10. In a junction box, a connector assembly comprising a plurality of clamping blocks, each adapted to clamp a pair of parallel cables, a metal base common to said blocks, and a clamping bolt for each block; a hollow insulating member shaped internally to receive the connector assembly, said member having wall openings disposed in staggered relation on opposite sides thereof for the reception of cable ends, and openings arranged to register with said bolts, for a clamping tool; a water-proof housing for said member having cable and tool openings, tubes of insulating material interconnecting the cable openings in said member and housing, and closure plugs for said housing tool openings.

CHARLES ANDREW BAY.